United States Patent
Zaun

[19]

[11] Patent Number: 6,061,325
[45] Date of Patent: May 9, 2000

[54] DUAL MODE AUTO-BALANCER FOR DVD DRIVES

[75] Inventor: Pat G. Zaun, Cary, N.C.

[73] Assignee: International Business Machines Corporation, Armonk, N.Y.

[21] Appl. No.: 09/047,895

[22] Filed: Mar. 25, 1998

[51] Int. Cl.[7] .................................................. G11B 19/20
[52] U.S. Cl. ........................................ 369/264; 360/99.08
[58] Field of Search .................................... 369/258, 264, 369/270, 271, 282, 263; 360/99.04, 99.08, 99.12; 74/572, 573 R, 574

[56] References Cited

U.S. PATENT DOCUMENTS

| | | | |
|---|---|---|---|
| 4,060,009 | 11/1977 | Wyman | 74/573 R |
| 4,075,909 | 2/1978 | Deakin | 74/573 R |
| 4,933,927 | 6/1990 | Ross | 369/270 |
| 5,054,016 | 10/1991 | J'Alayer et al. | 369/270 |
| 5,111,713 | 5/1992 | Cameron et al. | 74/573 R |
| 5,903,540 | 5/1999 | Ro et al. | 369/263 |

FOREIGN PATENT DOCUMENTS

| | | |
|---|---|---|
| 829872 | 3/1998 | European Pat. Off. . |
| 57-20915 | 2/1982 | Japan . |
| 62-24052 | 2/1987 | Japan . |
| 3290890 | 12/1991 | Japan . |
| 693136 | 10/1979 | Russian Federation . |

*Primary Examiner*—David L. Ometz
*Attorney, Agent, or Firm*—Anthony N. Magistrale; Michael E. Noe; Andrew J. Dillon

[57] ABSTRACT

A (DVD) drive unit for a variety of optical media including DVD discs or CD-ROM discs is capable of eliminating vibration while rotating and reading the optical media at either a constant linear velocity (CLV) or a constant angular velocity (CAV). In CAV mode, the drive unit uses ball bearings which are movable within a cavity in the turntable to counterbalance an unbalanced disc. In CLV mode, the drive unit utilizes a series of electromagnets to capture and symmetrically array the ball bearings within the cavity around the turntable.

13 Claims, 3 Drawing Sheets

DUAL MODE AUTO-BALANCER FOR DVD DRIVES

TECHNICAL FIELD

This invention relates in general to drive units for spinning optically-read media and in particular to a drive unit which is capable of eliminating vibration while rotating optical media at either a constant linear velocity or a constant angular velocity.

BACKGROUND ART

Media such as compact disc read-only memory (CD-ROM) or digital video disc (DVD) is read by a device which has a laser in a drive head. The laser scans or reads the disc as the device's drive unit spins the disc at a high rate of speed. The drive unit typically comprises a spindle motor with a turntable that supports the disc. Modern CD drive units operate at a constant angular velocity (CAV). In CAV mode, the speed of the spinning disc remains constant regardless of where the laser is reading data on the disc. Thus, the inner tracks on the disc read at a lower transfer rate than the outer tracks on the disc.

In contrast, DVD drive units may need to operate at a constant linear velocity (CLV) as well as CAV. The rate of rotation for CLV mode is designed to be less than that for CAV mode. In CLV mode, the spindle motor decreases the rate of rotation of the spinning disc as the drive head moves to read data at the outer tracks of the disc. Thus, when a drive unit is operating in CLV mode, the speed of the spindle motor is constantly changing since data from every track will be transferred at the same speed when the laser reads it.

Drive units which are capable of reading both CD and DVD media should be able to operate in both CAV and CLV modes. As CD drive speeds have increased (24×, 32× and beyond), the rate of rotation has also increased. Currently, the rate of rotation for CAV mode CD drives is approximately 6800 rpm. This high rate of speed has caused a significant problem in the industry because typical CD media is not perfectly balanced. When drive units spin even slightly unbalanced media at high rates of speed, vibration and noise are created. Such undesirable characteristics are unacceptable to consumers and may affect the long term reliability of the drive unit. As a result, high speed CD drive units typically utilize an auto-balancer spindle motor. This improved motor has several ball bearings which are free to move along a circular rail around the spindle motor. As the drive unit spins with unbalanced media, the ball bearings automatically move to counter-balance the imbalance.

Although auto-balancer spindle motors eliminate media imbalances, it has only been successful for CAV mode CD drives which operate in excess of 20× (approximately 4600 rpm). When the auto-balancer feature is used with CLV drives, the constantly changing speed of the motor never allows the ball bearings to find the proper position to perfectly counter-balance the unbalanced media, thereby exacerbating the vibration problem. Thus, there is a need for a drive unit which is capable of operating in both CAV and CLV modes without excessive vibration.

DISCLOSURE OF THE INVENTION

A digital video disk (DVD) drive unit which may be used with a variety of optical media including DVD discs or compact disc-random access memory (CD-ROM) discs is described. The drive unit has a motor, a turntable and a drive head with a laser. The turntable contains an annular cavity with several free rolling ball bearings which are capable of eliminating vibration while the disc is rotated at a constant angular velocity (CAV). In CAV mode, the drive unit uses the ball bearings to counterbalance an unbalanced CD-ROM disc. For DVD discs, the drive unit is operated at a constant linear velocity (CLV). In CLV mode, the drive unit utilizes a series of electromagnets to capture and symmetrically array the ball bearings within the cavity so that the motor can change speeds without being impeded by the free rolling ball bearings.

BEST MODE FOR CARRYING OUT THE INVENTION

Figure 1:
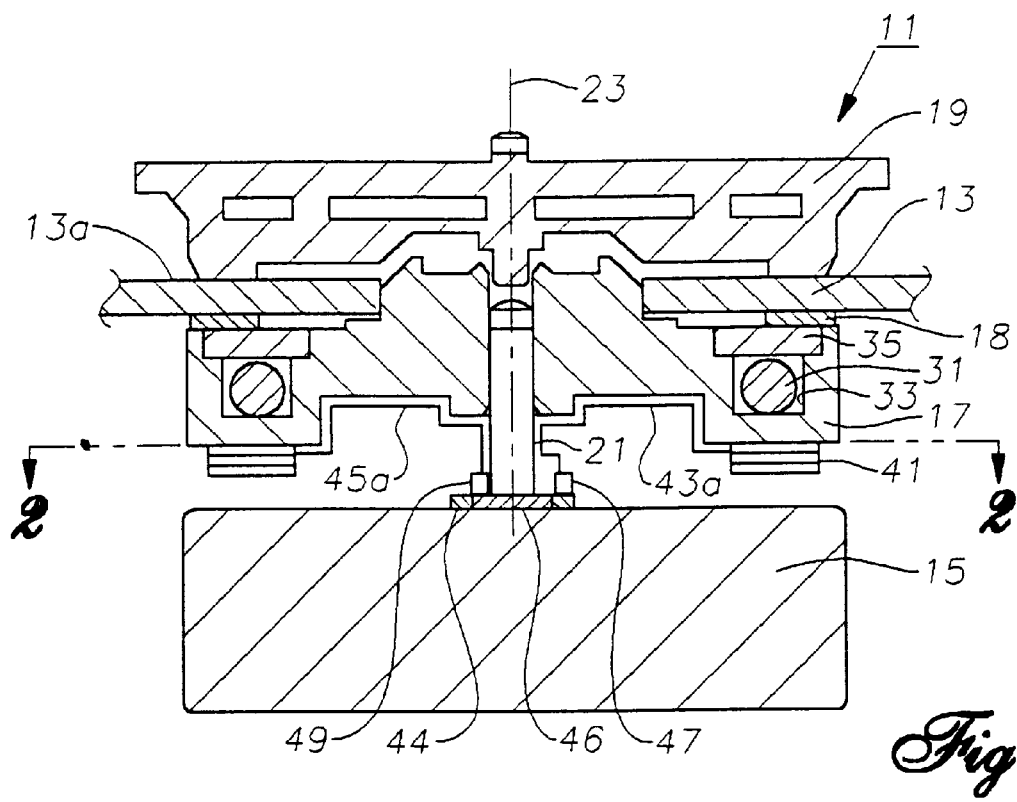
FIG. 1 is a sectional side view of a drive unit constructed in accordance with the invention.

Referring to FIG. 1, a drive unit 11 for spinning and reading a media disc 13 is shown. The major components of drive unit 11 include a spindle motor 15, a nonferrous turntable 17 and a pulley spindle 19. Disc 13 is sandwiched between a rubber pad 18 on turntable 17 and an axially movable pulley spindle 19. Motor 15 rotates turntable 17 and, thus, disc 13 with a drive shaft 21. Drive shaft 21 rotates about a central axis 23. Pulley spindle 19 rotates with the assembly and secures disc 13 from excess movement. A drive head (not shown) moves radially above disc 13 as it rotates. The upper surface 13a of disc 13 is read by a laser on the drive head while disc 13 is spun.

Motor 15 is capable of rotating disc 13 at either a constant angular velocity (CAV) or a constant linear velocity (CLV). In CAV mode, the speed of spinning disc 13 remains constant regardless of where the laser is reading data on disc 13. Thus, the inner tracks on disc 13 are moving at a lower linear velocity than the outer tracks on disc 13 at all times. In CLV mode, motor 15 decreases the rate of rotation of spinning disc 13 as the drive head moves to read data at the outer tracks of disc 13. Thus, when drive unit 11 is operating in CLV mode, the speed of motor 15 is constantly changing since every track will be rotating at the same linear velocity when the laser reads them.

Drive unit 11 is of the type which automatically balances the rotating load when an unbalanced disc 13 is spun by motor 15. A plurality of ferrous ball bearings 31 are located within an annular cavity 33 on an upper surface of turntable 17. Ball bearings 31 are sealed in cavity 33 with a plate 35. In the preferred embodiment, four to eight ball bearings 31 are used. Ball bearings 31 are free to move angularly about axis 23 within cavity 33. As will be explained in further detail below, ball bearings 31 may easily reposition themselves to counterbalance unbalanced disc 13.

Figure 2:
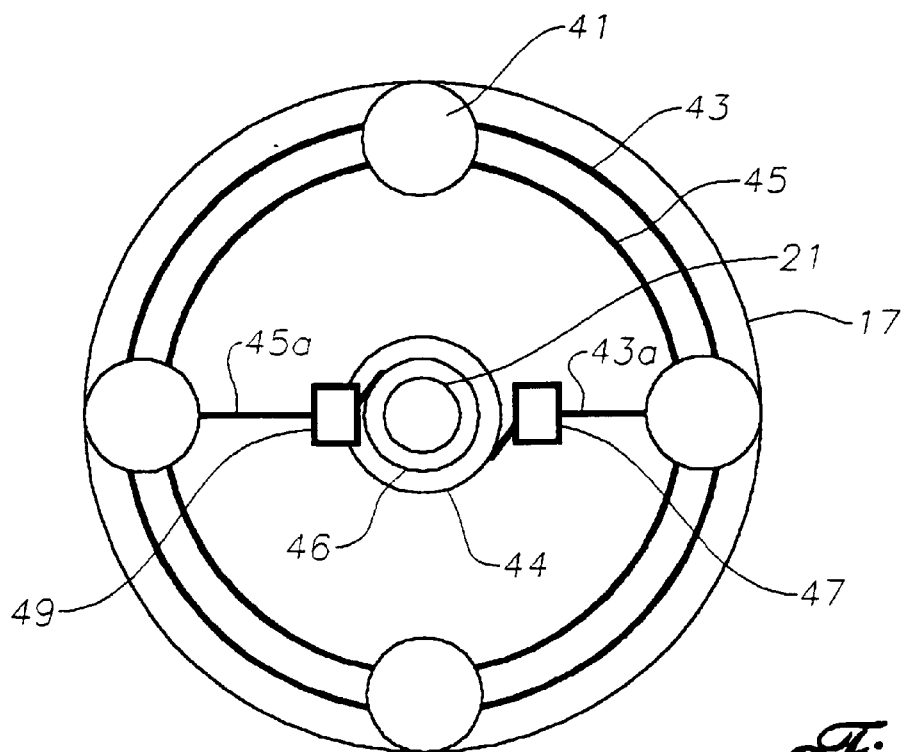
FIG. 2 is a sectional top view of the drive unit of FIG. 1 taken along the line 2—2 of FIG. 1.

As shown in FIGS. 1 and 2, drive unit 11 also comprises a series of electromagnetic coils 41 which are used in CLV mode. Coils 41 are equal in number to the number of ball bearings 31. In the embodiment shown, drive unit 11 has four coils 41 and four ball bearings 31. Coils 41 are symmetrically spaced apart and rigidly mounted to a lower side of turntable 17. Coils 41 are interconnected by a five-volt power trace 43 and by a ground trace 45. Power trace 43 is connected to a ring 44 near shaft 21 via a lead 43a and a power contact brush 47. Ground trace 45 is connected to a ring 46 near shaft 21 via a lead 45a and a ground contact brush 49. Brushes 47, 49 are shown schematically in FIG. 2. Brushes 47, 49 rotate while rings 44, 46 and shaft 21 are stationary. Rings 44, 46 are connected to a printed circuit board (not shown) of drive unit 11 where its firmware engages and disengages coils 41.

Figure 3:
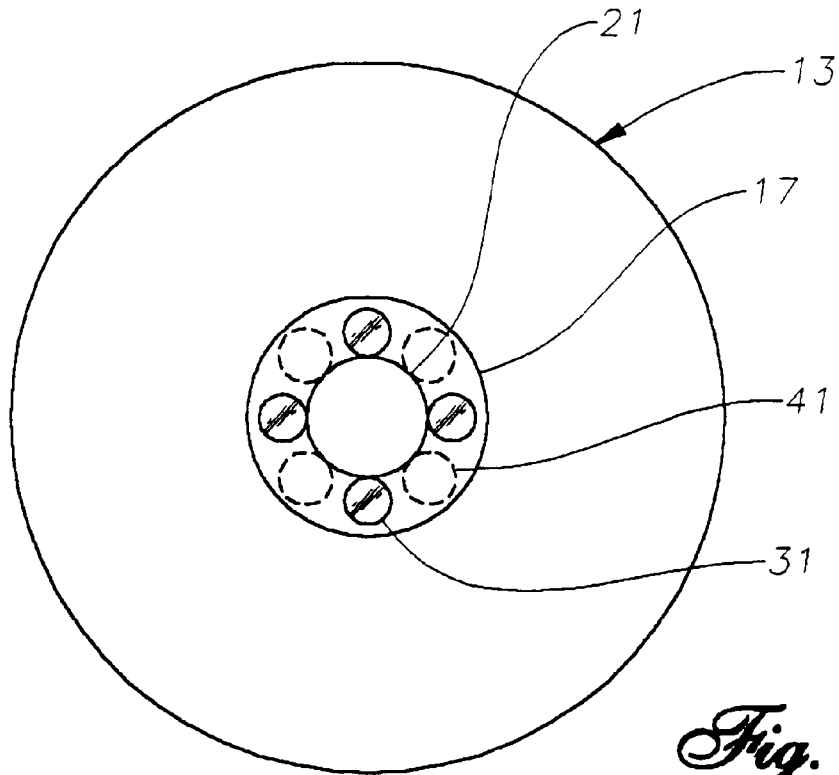
FIG. 3 is a schematic top view of the drive unit of FIG. 1 while rotating at a constant angular velocity with a balanced media.
Figure 4:
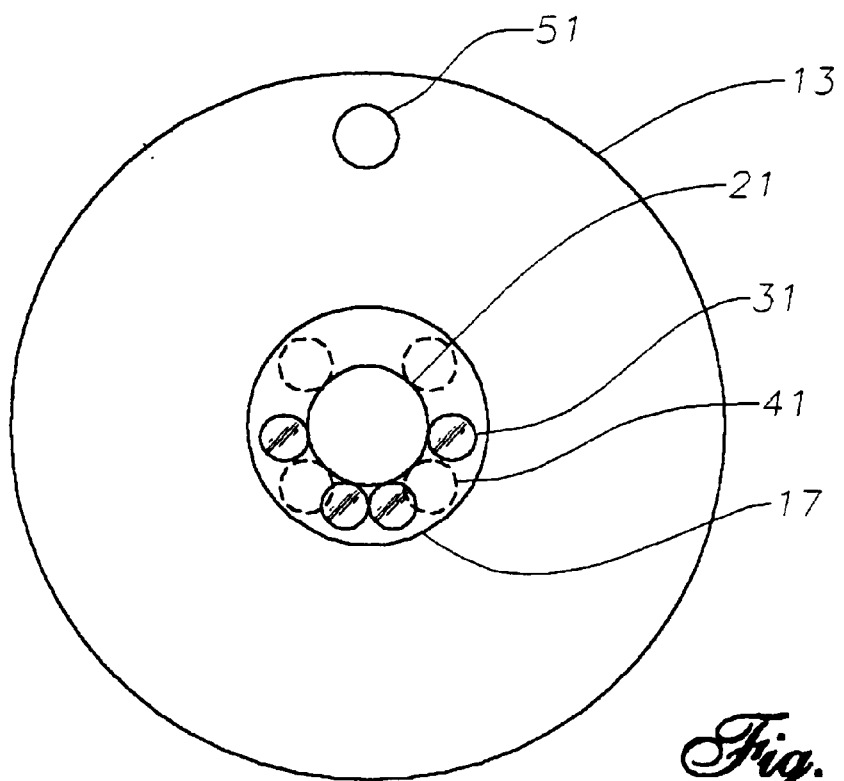
FIG. 4 is a schematic top view of the drive unit of FIG. 1 while rotating at a constant angular velocity with a slightly unbalanced media.
Figure 5:
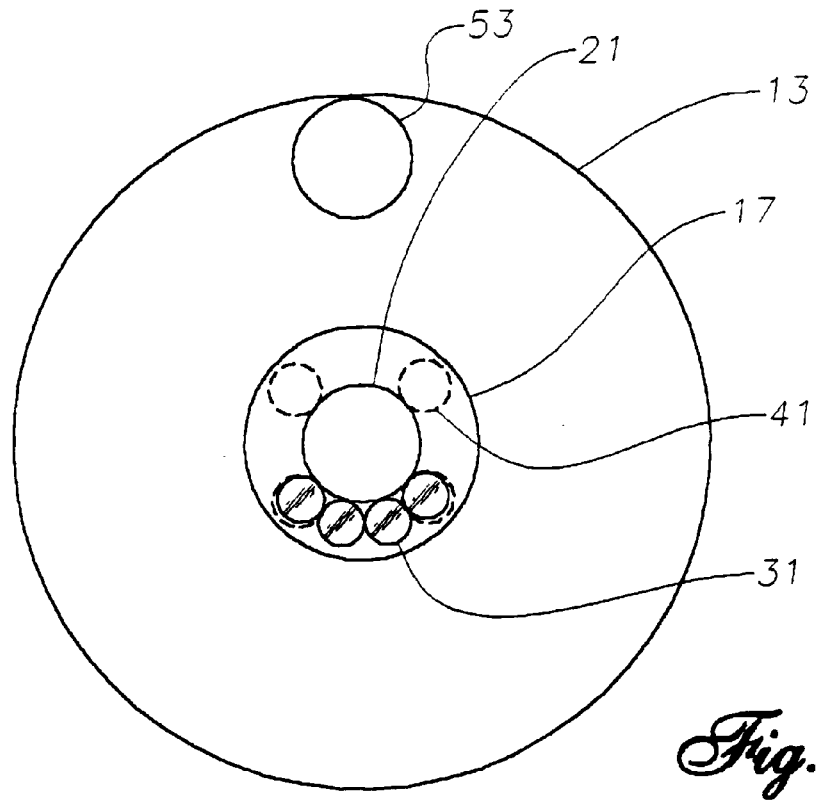
FIG. 5 is a schematic top view of the drive unit of FIG. 1 while rotating at a constant angular velocity with a significantly unbalanced media.

In operation, motor 15 rotates disc 13 in either CAV or CLV mode. In CAV mode, ball bearings 31 are free to move about axis 23 in cavity 33 since coils 41 are always disengaged. As shown in FIG. 3, ball bearings 31 will naturally array themselves symmetrically about cavity 33 if disc 13 is perfectly balanced. If disc 13 is slightly imbalanced, ball bearings 31 will move away from the more heavily weighted side of the disc. For example, in FIG. 4 a small mass 51 (approximately 5 grams) is positioned near the radial outer edge of disc 13. To compensate or counterbalance mass 51, ball bearings 31 have automatically moved slightly from their original symmetrical spaced-apart positions to the positions shown in FIG. 4. In another example (FIG. 5) a larger mass 53 (approximately 10 grams) is positioned near the radial outer edge of disc 13. To counterbalance mass 53, ball bearings 31 have automatically moved to the opposite side of cavity 33. It takes a small amount of time for ball bearings 31 to reach their steady-state positions before the vibration is eliminated. If the rate of rotation of turntable 17 is constant, then vibration can be eliminated almost entirely. If the rate of rotation changes slightly, it will take a short time for ball bearings 31 to reposition. Again, coils 41 are never engaged while drive unit 11 is operating in CAV mode.

Figure 6:
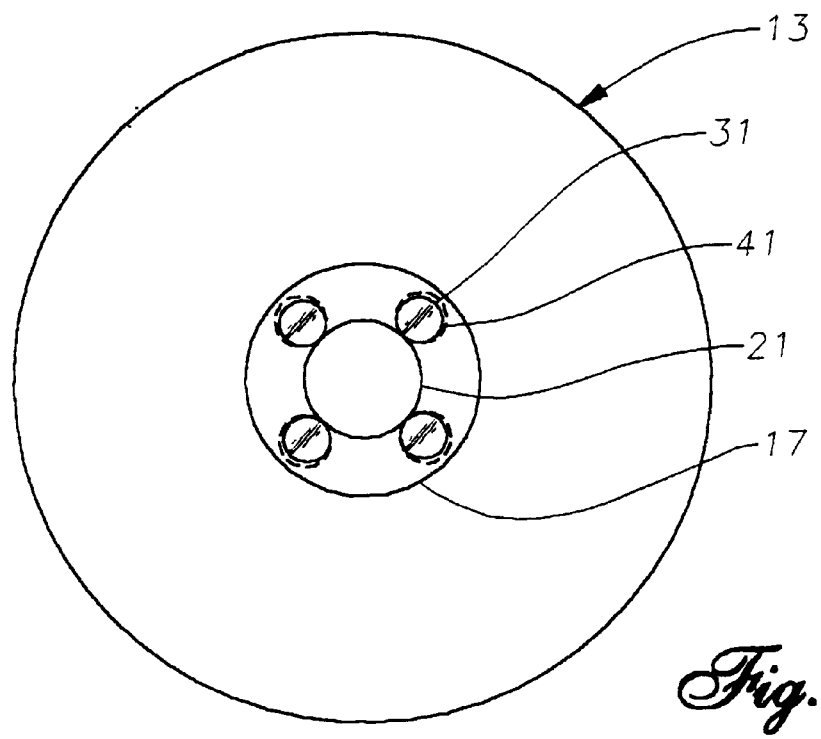
FIG. 6 is a schematic top view of the drive unit of FIG. 1 while rotating at a constant linear velocity.

In the relatively slower rotating CLV mode, the constantly changing speed of motor 15 never allows ball bearings 31 to symmetrically align around cavity 33. To remedy this problem, drive unit 11 activates coils 41 to create an electromagnetic field which permeates turntable 17. The electromagnetic field is small enough to attract only one of ball bearings 31, but strong enough to hold one ball bearing 31 directly above a coil 41 as long as it is energized. This effect is illustrated in FIG. 6. Thus, when drive unit 11 is operating in CLV mode, ball bearings 31 are "frozen" in a stationary position relative to cavity 33 by coils 41 so that they will not obstruct the speed of motor 15 during speed changes. This freezing action is necessary in CLV mode to minimize vibration. The auto-balancing feature described above for CAV mode is not required in CLV mode since vibration is not a problem at lower rates of rotation.

It is possible for a ball bearing 31 to become trapped between adjacent ball bearings 31 that have already been frozen in position, or for a single coil 41 to capture more than one ball bearing 31. In either of these events, the trapped ball bearing 31 will be unable to freely move around cavity 33 to its own coil 41. This problem may be solved in a number of ways. One solution is to limit the power of the magnetic field so that it is only capable of retaining one ball bearing 31 for more than a specified period of time. Another solution is to pulse the magnetic field for a few milliseconds when it is first initiated. The brief pauses between the generated fields allows each ball bearing 31 to find its own coil 41.

The invention has several advantages. The drive unit may be used with a variety of optically-read media including DVD or CD-ROM discs. The drive unit is capable of eliminating vibration while rotating and reading the optical media at either a constant linear velocity or a constant angular velocity.

While the invention has been shown or described in only some of its forms, it should be apparent to those skilled in the art that it is not so limited, but is susceptible to various changes without departing from the scope of the invention. For example, mechanical arms may be programmed to capture the ball bearings and hold them stationary when the drive is in CLV mode.

I claim:

1. A drive unit for rotating and reading optical media selectively at a constant angular velocity and at a constant linear velocity, comprising:

a turntable for supporting the media and which rotates about an axis;

an annular cavity located within the turntable concentric with the axis;

a motor which selectively rotates the turntable at a constant angular velocity and at a constant linear velocity;

a plurality of weight members located and movable within the cavity for counterbalancing imbalanced media when the turntable is rotated at the constant angular velocity by the motor; and an electromagnetic spacing device for causing the weight members to symmetrically space apart from one another within the cavity when the motor is rotating the media at the constant linear velocity so as to minimize vibration when the motor is changing speeds.

2. The drive unit of claim 1 wherein the electromagnetic spacing device has a deactivated mode which allows the weight members to freely roll about the cavity when the drive unit is rotating the media at the constant angular velocity, the electromagnetic spacing device automatically switching to an activated mode, spacing the weight members symmetrically apart from one another, when the motor begins to operate at the constant linear velocity.

3. The drive unit of claim 1 wherein the electromagnetic spacing device is mounted to a lower side of the turntable for rotation therewith.

4. The drive unit of claim 1 wherein the weight members comprise ferrous ball bearings; and wherein the electromagnetic spacing device comprises an electromagnetic coil which provides an electromagnetic field when the motor is operating at the constant linear velocity, the electromagnetic field limiting movement of the ball bearings relative to the turntable.

5. The drive unit of claim 1 wherein the electromagnetic spacing device comprises a plurality of electromagnetic coils mounted to the turntable and symmetrically spaced apart from one another relative to the axis for creating magnetic fields to attract and prevent movement of the weight members in the annular cavity.

6. The drive unit of claim 5 wherein the electromagnetic coils are equal in number to the number of weight members located within the cavity.

7. The drive unit of claim 5, further comprising:

a pair of contact rings located adjacent to the motor;

a pair of electrical traces interconnecting the electromagnetic coils to the contact rings via contact brushes.

8. A drive unit for rotating optical media, comprising:

a turntable having a central axis of rotation and an upper surface for supporting the media;

an annular channel located within the turntable concentric with the axis;

a spindle motor having an output shaft which selectively rotates the turntable at a constant angular velocity and at a constant linear velocity;

a plurality of ferrous ball bearings located and movable within the channel for counterbalancing imbalanced media when the motor is rotating the turntable at a constant angular velocity; and a plurality of electromagnetic coils mounted to the turntable adjacent to the channel, the coils being radially and symmetrically spaced apart from one another about the central axis, the coils creating electromagnetic fields when energized for causing the ball bearings to symmetrically space apart from one another within the channel when the motor is rotating the media at the constant linear velocity so as to minimize vibration when the motor is changing speeds.

9. The drive unit of claim 8 wherein the electromagnetic coils are equal in number to the number of the ball bearings located within the cavity.

10. The drive unit of claim 8 wherein the electromagnetic coils are mounted to a lower side of the turntable for rotation with the turntable.

11. The drive unit of claim 8, further comprising:

a pair of contact rings located adjacent to the motor;

a pair of electrical traces interconnecting the electromagnetic coils to the contact rings via contact brushes.

12. A method for rotating and reading optical media selectively at a constant angular velocity and at a constant linear velocity, comprising:

(a) providing a drive unit with a turntable, a motor which selectively rotates the turntable about an axis, an annular cavity located within the turntable concentric with the axis, and a plurality of weight members located and movable within the cavity;

(b) loading the optical media onto the turntable;

(c) rotating the turntable with the motor at a constant angular velocity;

(d) counterbalancing imbalanced media when the turntable is rotated at the constant angular velocity by the motor by allowing the weight members to move to counterbalancing positions;

(e) rotating the turntable at a constant linear velocity; and (f) activating an electromagnetic spacing device to cause the weight members to symmetrically space apart from one another within the cavity when the motor is rotating the media at the constant linear velocity so as to minimize vibration when the motor is changing speeds.

13. The method of claim 12 wherein step (f) comprises activating an electromagnetic coil which provides an electromagnetic field when the motor is operating at the constant linear velocity, the electromagnetic field preventing movement of the weight members relative to the turntable.

* * * * *